United States Patent Office 2,750,385
Patented June 12, 1956

2,750,385
PRODUCTION OF TETRAHYDRO-PYRIDINES FROM TETRAHYDRO-1,3-OXAZINES

Claude J. Schmidle, Moorestown, and Richard C. Mansfield, Haddonfield, N. J., assignors to Rohm & Haas Company, Philadelphia, Pa., a corporation of Delaware No Drawing. Application May 21, 1954,
Serial No. 431,587

7 Claims. (Cl. 260—290)

This invention concerns a process for rearranging 6-alkyltetrahydro-1,3-oxazines to tetrahydropyridines. The process comprises heating a 6-alkyltetrahydro-1,3-oxazine in an acidic environment provided by an aqueous strong, non-oxidizing mineral acid. During this procedure rearrangement and dehydration occur.

The acids which serve as catalysts for rearrangement and dehydration are non-oxidizing acids having a greater acidity than phosphoric acid. The term "non-oxidizing" as here used refers to the stability or non-oxidizing action of the acid in the reaction mixtures of this invention and under the conditions used. These include hydrochloric acid, hydrobromic acid, and sulfuric acid. Such sulfonic acids as p-toluenesulfonic acid, methanesulfonic acid, and butanesulfonic acid are also effective. The hydrohalides may be used in the form of concentrated aqueous solutions, for example, from about 10% to 40% for hydrochloric acid. Even more dilute solutions could be used, but without particular advantage. Sulfuric acid should be diluted to an aqueous 10% to 80% solution.

The amount of acid used is in excess of the 6-alkyltetrahydro-1,3-oxazine, which contains a basic group. Even ratios of 10 to 20 equivalents of acid per mole or equivalent of said oxazine may be used. A considerable excess helps to speed up conversion to tetrahydropyridine. The reaction is also accelerated by raising the temperature. In order to make possible isolation of the tetrahydropyridine, the reaction is continued until oxazine is mostly consumed.

The 6-alkyltetrahydro-1,3-oxazines have the structure

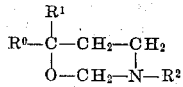

wherein $R^0$ is hydrogen, or an alkyl or an aryl group, $R^1$ is an alkyl group, preferably of one to two carbon atoms, this group having hydrogen on the alpha carbon atom thereof, or $R^0$ and $R^1$ may together form a carbocycle, as from methylenecyclohexane, or terpenes, such as β-pinene or camphene, and $R^2$ is an alkyl, alkenyl, cycloalkyl, or aralkyl group, or such group having as a substituent a halo, hydroxy, alkoxy, carboxy, carbalkoxy, or tertiary amino group. Typical groups as $R^2$ are methyl, ethyl, propyl, isopropyl, butyl, 2-ethylhexyl, octyl, tert-octyl, dodecyl, allyl, methallyl, crotyl, undecenyl, dodecenyl, cyclohexyl, methylcyclohexyl, benzyl, methylbenzyl, phenylethyl, dimethylaminoethyl, dimethylaminopropyl, diethylaminopropyl, methoxypropyl, ethoxyethyl, butyoxyethyl, chloroethyl, hydroxyethyl, hydroxypropyl, carboxymethyl, carbomethoxymethyl, etc. It is preferred that the alkyl and alkenyl groups contain not over 12 carbon atoms.

Compounds of the above structure can be conveniently prepared by reacting together in the presence of a hydrogen halide an olefin, $CH_2=C(R^0)R^1$, formaldehyde, and a primary amine, $R^2NH_2$, the —$NH_2$ group being the only substituent thereof reacting under these conditions. Usually hydrochloric or hydrobromic acid is used as the catalyst in this reaction. Such catalyst may conveniently be supplied by amine hydrohalide.

The reaction is usually carried out between 50° and 150° C., often in the presence of an inert solvent, such as water, alcohols, ethers, and hydrocarbons. Reactions of various olefins, formaldehyde, and primary amine hydrohalides are described in U. S. Patent 2,647,117 to Hartough et al. As there shown the principal reaction products are 6-alkyltetrahydro-1,3-oxazines. These are isolated in their basic form after neutralization of their hydrohalides.

The olefins used in this reaction for purposes of the present invention contain a vinylidene group, which provides the group $R^1$ with hydrogen on the alpha carbon atom thereof. Typical starting olefins are propene, 1-butylene, isobutylene, 1-amylene, 2-methyl-1-butene, diisobutylene, methylenecyclohexane, β-pinene, α-methylvinylnaphthalene, α-methylstyrene, α-ethylstyrene, p-methyl-α-methylstyrene, and other monovinylbenzenes.

Rearrangement of a 6-alkyltetrahydro-1,3-oxazine, as explained, is effected between 75° and 150° C. At the lower end of this range of temperature the conversion to a tetrahydropyridine requires a longer time. Above 100° C. a relatively shorter time can be used and with excess acid above that required merely to maintain the reaction mixture acidic, the dehydro-rearrangement to the tetrahydropyridines is hastened.

These compounds have the structure

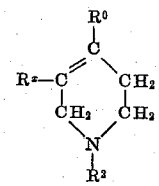

where $R^x$ is hydrogen or an alkyl group, being derived from the $R^1$ group of the tetrahydro-1,3-oxazine or $R^0$ and $R^x$ together with the intervening carbons may form a carbocycle. $R^2$ is a group as previously defined.

Typical rearrangements are described in more detail in the following illustrative examples. Parts shown are by weight.

Example 1

To 73 parts of 3,6-dimethyl-6-phenyltetrahydro-1,3-oxazine was slowly added 100 parts of concentrated hydrochloric acid. The mixture was stirred at 90–95° C. for three hours, allowed to stand overnight, and then stirred at 90–95° C. for another hour. After being diluted with 300 parts of water, the solution was made basic with sodium hydroxide and the liberated basic material was extracted with two 90 part portions of benzene, dried over anhydrous potassium carbonate, stripped, and distilled to give 57 parts of 1-methyl-4-phenyltetrahydropyridine, distilling at 80–95° C./0.75 mm. Hg. Neutral equivalent: found—172, calculated—173.

Substitution for the above hydrochloric acid of hydrobromic acid of 40% strength leads to the same end result.

Example 2

Fifty parts of 3,6-dimethyl-6-phenyltetrahydro-1,3-oxazine and a mixture of 100 parts of concentrated sulfuric acid and 50 parts of water were mixed slowly with external cooling. The mixture was then heated at 95–100° C. for six hours with constant stirring, allowed to stand over the weekend, poured into 300 parts of water, made basic with sodium hydroxide, and extracted with three 90 part portions of benzene. The benzene extracts were dried over anhydrous potassium carbonate, stripped, and distilled to give 36 parts of 1-methyl-4-phenyltetrahydro pyridine, distilling at 85–90° C./0.75 mm. Hg.

This compound that the structure

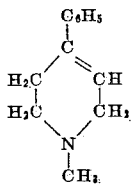

and may also be named 1-methyl-4-phenyl-1,2,5,6-tetrahydropyridine.

*Example 3*

A mixture of 75 parts of water, 150 parts of concentrated sulfuric acid, and 74 parts of 3-n-butyl-6-methyl-6-phenyltetrahydro-1,3-oxazine ($n_D^{25}$, 1.5327) was stirred on a steam bath for six hours, cooled, poured into 500 parts of water, extracted with toluene and made basic with aqueous caustic soda solution. The material which separated was extracted with toluene, dried over potassium carbonate, and distilled to give 50 parts of 1-n-butyl-4-phenyltetrahydropyridine, distilling at 115–120° C./0.7 mm. and having a refractive index $n_D^{25}$, of 1.5440. Analysis gave the following data: carbon, 82.92%; hydrogen, 9.96%; and nitrogen, 6.79%. Theoretical values are 83.66%, 9.83%, and 6.51% respectively.

*Example 4*

A mixture of 75 parts of water, 15 parts of concentrated sulfuric acid, and 78 parts of 3-n-hexyl-6-methyl-6-phenyltetrahydro-1,3-oxazine ($n_D^{25}$, 1.5268) was stirred on a steam bath for six hours, allowed to stand overnight, poured into 1000 parts of water and made alkaline with caustic. The liberated basic material was extracted with toluene, dried over anhydrous potassium carbonate, and distilled to give 20 parts of 1-n-hexyl-4-phenlytetrahydropyridine, distilling at 137–142° C./0.75 mm. and having a refractive index, $n_D^{25}$, of 1.5347. By analysis this material contained: carbon, 83.26%; hydrogen, 10.54%; and nitrogen, 5.92%. Corresponding theoretical values are 83.89%, 10.35%, and 5.76% respectively.

*Example 5*

A mixture of 40 parts of water, 80 parts of concentrated sulfuric acid, and 40 parts of 3-allyl-6-methyl-6-p-tolyltetrahydro-1,3-oxazine was stirred on a steam bath for six hours, allowed to stand overnight, poured into 500 parts of water and made alkaline with caustic solution. The basic material which separated was extracted with toluene, dried over anhydrous potassium carbonate, and distilled to give 27 parts of 1-allyl-4-p-tolyltetrahydropyridine, distilling at 115–125° C./0.7 mm. Hg. This solidified and melted at 40–42° C. after one recrystallization from heptane. Analysis gave the following data: carbon, 83.90%; hydrogen, 9.11%; and nitrogen, 6.65%. Corresponding theoretical values are 84.45%, 8.98%, and 6.57% respectively.

*Example 6*

A mixture of 60 parts of water, 120 parts of concentrated sulfuric acid, and 74 parts of 3-benzyl-6-methyl-6-p-tolyltetrahydro-1,3-oxazine ($n_D^{25}$, 1.5644) was stirred at 95–100° C. for six hours, allowed to stand overnight, poured into 500 parts of water, and made alkaline with caustic soda solution. The liberated basic material was extracted with toluene, dried over anhydrous potassium carbonate, and distilled to give 53 parts of 1-benzyl-4-p-tolyltetrahydropyridine, distilling at 168–173° C./0.68 mm. Hg and having a refractive index, $n_D^{25}$, of 1.5953. Analysis gave the following data: carbon, 86.57%; hydrogen, 8.14%; and nitrogen, 5.42%. Corresponding theoretical values are 86.64%, 8.04%, and 5.32% respectively.

*Example 7*

A mixture of 35 parts of ice, 70 parts of concentrated sulfuric acid, and 35 parts of 3-n-butyl-6-methyl-6-p-tolyltetrahydro-1,3-oxazine ($n_D^{25}$, 1.5308) was stirred on a steam bath for five hours, allowed to stand overnight, poured into 500 parts of water and made alkaline with caustic solution. The liberated basic material was extracted with toluene, dried over anhydrous potassium carbonate and distilled to get 21 parts of 1-n-butyl-4-p-tolyltetrahydropyridine, distilling at 128.133° C./0.8 mm. Hg and having a refractive index, $n_D^{25}$, of 1.5427. Analysis gave the following data: carbon, 83.51%; hydrogen, 10.26%; and nitrogen, 6.20. Corresponding theoretical values are 83.78%, 10.11%, and 6.11% respectively.

*Example 8*

(a) To 135 parts of stirred, cooled 3-methoxypropylamine was slowly added 300 parts of aqueous 37% formaldehyde solution followed by 150 parts of concentrated hydrochloric acid and 177 parts of α-methylstyrene. The mixture was stirred at 100° C. for four hours, allowed to stand overnight, poured into 1000 parts of water, extracted with toluene and made basic with aqueous caustic soda solution. The liberated basic material was extracted with toluene, dried over anhydrous potassium carbonate, and distilled to give 112 parts of 3-(3-methoxypropyl)-6-methyl-6-phenyltetrahydro-1,3-oxazine, coming over at 120–145° C./0.8 mm. and having a refractive index, $n_D^{25}$, of 1.5277.

(b) To a mixture of 80 parts of ice and 160 parts of concentrated sulfuric acid was slowly added 105 parts of the above oxazine. The mixture was stirred on a steam bath for six hours, allowed to stand over the weekend, poured into 1000 parts of water, extracted with heptane, and made basic with caustic soda solution. The liberated basic material was extracted with toluene, dried over anhydrous potassium carbonate, and distilled to give 56 parts of 1-(3-methoxypropyl)-4-phenyltetrahydropyridine, distilling at 132–145° C./0.7 mm. and having a refractive index, $n_D^{25}$, of 1.5488.

The above examples demonstrate that a great variety of 6-alkyltetrahydro-1,3-oxazines may be used as starting materials and converted to 1,2,5,6-tetrahydropyridines. The N-substituent in the 3-position of the tetrahydrooxazine appears in the 1-position of the tetrahydropyridine. This may be alkyl, cycloalkyl, aralkyl, or alkenyl, or as shown in Example 8, a similar group carrying a hetero atom or group. Thus, 3-ethyl-6-methyl-6-phenyltetrahydro-1,3-oxazine yields 1-ethyl-4-phenyltetrahydropyridine; 3-cyclohexyl-6-methyl-6-phenyltetrahydro-1,3-oxazine yields 1-cyclohexyl-4-phenyltetrahydropyridine; 3-isononyl-6-methyl-6-phenyltetrahydro-1,3-oxazine yields 1-isononyl-4-phenyltetrahydropyridine; 3-undecenyl-6-methyl-6-phenyltetrahydro-1,3-oxazine yields 1-undecenyl-4-phenyltetrahydropyridine; etc.

The examples also indicate how there may be present inert substituents in the phenyl ring. In place of the methyl group shown above, there may be present other alkyl substituents, ethyl, isopropyl, butyl, amyl, octyl, chloro, and bromo being of particular interest. Such groups, of course, play no part in the various reactions involved. They are of help in stabilizing the compounds. For instance, the reaction leading to the N-cyclohexyl derivatives is better accomplished with the substituted phenyl olefins than with the unsubstituted.

In place of starting with α-methylstyrene to form a tetrahydro-1,3-oxazine, there may be used other α-substituents than methyl provided they have at least one hydrogen on the carbon atom attached to the olefinic carbon. The ethyl group, for example, can appear in place of the α-methyl group. Thus, α-ethylstyrene, formaldehyde, and methylamine are reacted in the presence of hydrogen chloride as catalyst to form 3-methyl-6-phenyl-6-ethyltetrahydro-1,3-oxazine as the principal product. When this product is heated at about 100° C. for eight hours in the presence of two to five molar proportions of aqueous hydrochloric acid, there is separated 1,3-dimethyl-4-phenyl-1,2,5,6-tetrahydropyridine.

The reaction of this invention is also applicable to tetrahydro-1,3-oxazines having groups other than phenyl in the 6-position. Thus, 3,6,6-trimethyltetrahydro-1,3-oxazine is prepared from isobutylene, formaldehyde and methylamine hydrochloride. When this tetrahydrooxazine is heated with a two molar proportion of hydrochloric acid until conversion is practically complete, there is separated as by distillation, 1,4-dimethyltetrahydropyridine. In the same way diisobutylene, formaldehyde, and methylamine hydrochloride react to give chiefly 3,6-dimethyl-6-(2,2-dimethylpropyl) tetrahydro-1,3-oxazine. When this is heated with an excess of aqueous hydrochloric or sulfuric acid until conversion is practically complete, there is obtained 1 - methyl-4-(dimethylpropyl)tetrahydropyridine.

The tetrahydropyridines are useful chemical intermediates. They can be dehydrogenated to give important substituted pyridines. They can be hydrogenated to corresponding piperidines. They can be reacted to give 4-piperidinols. The tetrahydropyridines are effective as inhibitors for protecting metals during pickling.

We claim:

1. A process which comprises heating a 6-alkyltetrahydro-1,3-oxazine, the 6-alkyl group of which contains not over two carbon atoms, between 75° and 150° C. with an excess of an aqueous non-oxidizing acid stronger than phosphoric acid and separating a tetrahydropyridine from the reaction mixture.

2. A process which comprises heating 3,6-dimethyl-6-phenyltetrahydro-1,3-oxazine between 75° and 150° C. with an excess of an aqueous non-oxidizing acid stronger than phosphoric acid and separating 1-methyl-4-phenyltetrahydropyridine from the reaction mixture.

3. A process which comprises heating 3-n-butyl-6-phenyltetrahydro-1,3-oxazine between 75° and 150° C. with an excess of a non-oxidizing acid stronger than phosphoric acid and separating 1-n-butyl-4-phenyltetrahydropyridine.

4. A process which comprises heating 3-allyl-6-methyl-6-p-tolyltetrahydro-1,3-oxazine between 75° and 150° C. with an excess of a non-oxidizing acid stronger than phosphoric acid and separating 1-allyl-4-p-tolyltetrahydropyridine.

5. A process which comprises heating 3-(3-methoxypropyl)-6-methyl-6-phenyltetrahydro-1,3-oxazine between 75° and 150° C. with an excess of a non-oxidizing acid stronger than phosphoric acid and separating 1-(3-methoxypropyl)-4-phenyltetrahydropyridine.

6. A process which comprises heating 3-benzyl-6-methyl-6-p-tolyltetrahydro-1,3-oxazine between 75° and 150° C. with an excess of a non-oxidizing acid stronger than phosphoric acid and separating 1-benzyl-4-p-tolyltetrahydropyridine.

7. A process which comprises heating a tetrahydro-1,3-oxazine of the structure

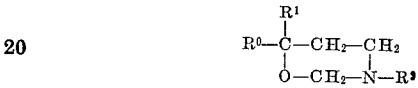

in an acidic mixture with an excess thereover of an aqueous solution of an acid from the class consisting of hydrochloric and sulfuric acids at a temperature between 75° and 150° C. and separating a tetrahydropyridine from the reaction mixture, $R^1$ being an alkyl group, $R^0$ being a member of the class consisting of hydrogen and alkyl and monocyclic aryl groups, and $R^2$ being a member of the class consisting of alkyl, alkenyl, cyclohexyl, and benzyl groups, the alkyl and alkenyl groups having not over 12 carbon atoms.

References Cited in the file of this patent
UNITED STATES PATENTS
2,647,117    Hartough et al. _____ July 28, 1953